Dec. 2, 1952     R. F. DORNAUS     2,619,714
METHOD OF ATTACHING A LINE GUIDE TO FISHING RODS
Filed March 28, 1947     2 SHEETS—SHEET 1
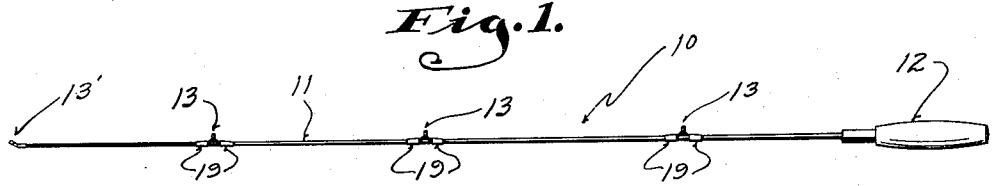
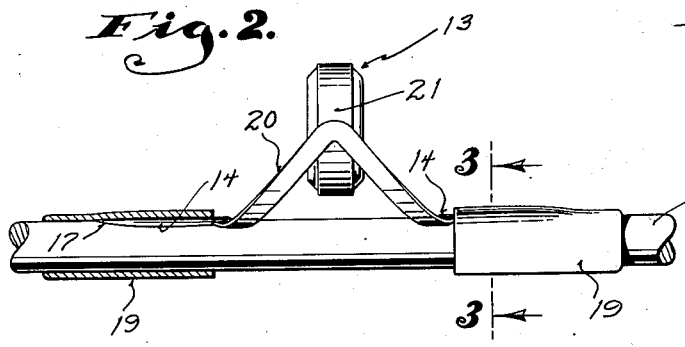
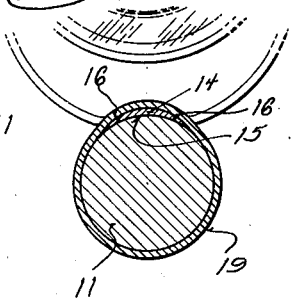
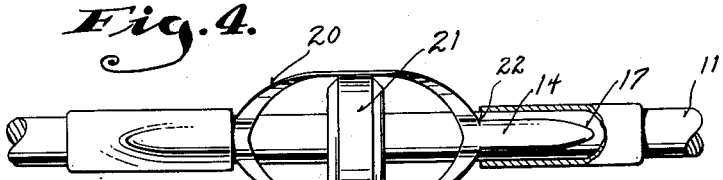
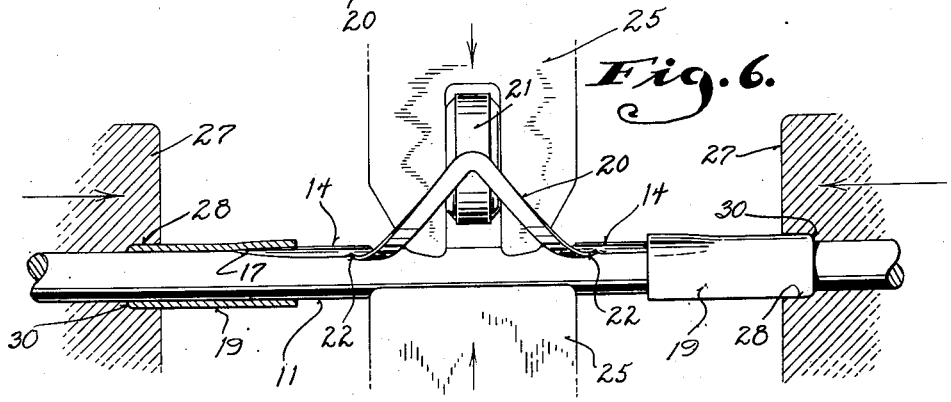
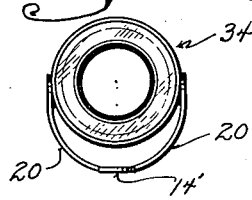
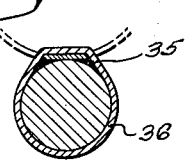
Inventor
Reinert F. Dornaus Dec. 2, 1952  R. F. DORNAUS  2,619,714
METHOD OF ATTACHING A LINE GUIDE TO FISHING RODS
Filed March 28, 1947  2 SHEETS—SHEET 2

Inventor
Reinert F. Dornaus
By
Attorney

Patented Dec. 2, 1952

2,619,714

UNITED STATES PATENT OFFICE 2,619,714

METHOD OF ATTACHING A LINE GUIDE TO FISHING RODS

Reinert F. Dornaus, Manitowoc, Wis., assignor to Kaufman Manufacturing Company, Manitowoc, Wis., a corporation of Wisconsin Application March 28, 1947, Serial No. 737,844

1 Claim. (Cl. 29—148)

This invention relates to fishing rods and has more particular reference to line guides such as are used on bait and fly casting rods, and concerns the manner of attaching such line guides to the rods.

At present, the most widely employed manner of attaching line guides to fishing rods consists in wrapping silk thread about the attaching tangs which project from opposite sides of the guides to lie against the exterior of the rod, and in order to bind the threads together into a whole and also protect the same, one or more coats of water-proof varnish or the like is applied to the wrapping.

The attachment of line guides to fishing rods in this manner is usually accomplished manually and consequently represents a tedious and expensive procedure. Moreover these bindings cannot afford a permanent joint or attachment for the line guides as the threads are subject to tearing with consequent loosening of the guides. Hence, it will be seen that the use of silk thread bindings for lines guides on fishing rods involves frequent varnishing and checking of the condition of the binding with occasional rebinding with fresh thread.

Efforts recently have been made to improve the bindings for line guides through the use of fine wire for this purpose instead of thread. In order to properly bind the wire together, however, it is necessary to flow solder over the wire, and wire bindings are thus also rendered excessively expensive. Also, their use is substantially limited to fishing rods having steel blades, since it is next to impossible to solder these joints effectively on some of the lightweight alloy metals now being used for fishing rod blades.

In attempts to depart from the silk thread and wire bindings for line guides, it has been proposed to anchor the line guides in position on fishing rods by the use of metal sleeves encircling the rod and either passing over or attached directly to the tangs on the guides.

These latter proposed methods of attaching line guides to fishing rods have never come into widespread use because of their inability to effect rigid anchoring of the guides in place without resorting to soldering, or its equivalent, of the sleeves onto the rod blade. In the absence of a soldered joint, the guides were insecurely held on the blade of the rod with the result that the same were subject to shifting and objectionable lateral rocking on the rod blade.

With these objections to past practices in mind, it is an object of this invenion to provide an improved manner of rigidly attaching line guides to the blades of fly and bait casting rods.

Another object of this invention resides in the provision of an improved method of anchoring line guides in place on fishing rods.

With the above and other objects in view, which will appear as the description proceeds, this invention resides in the novel construction, combination and arrangement of parts substantially as hereinafter described and more particularly defined by the appended claim, it being understood that such changes in the precise embodiment of the herein disclosed invention may be made as come within the scope of the claim.

The accompanying drawings illustrate two complete examples of the physical embodiment of the invention constructed according to the best modes so far devised for the practical application of the principles thereof, and in which:

Figure 1 is an elevational view of a fishing rod having line guides attached thereto by the improved attaching means of this invention;

Figure 2 is an enlarged side elevational view of a portion of the fishing rod shown in Figure 1 illustrating the manner in which one of its line guides is rigidly anchored in position upon the blade of the rod;

Figure 3 is a cross sectional view taken along the plane of the line 3—3 in Figure 2;

Figure 4 is a top view of the line guide and its attaching means shown in Figure 2;

Figure 5 is an end view of a conventional line guide per se;

Figure 6 is a more or less diagrammatic view illustrating the method of applying the anchoring sleeves for the line guides;

Figure 9 is a cross sectional view similar to Figure 3 but illustrating a slightly modified embodiment of the invention.

Figure 7:
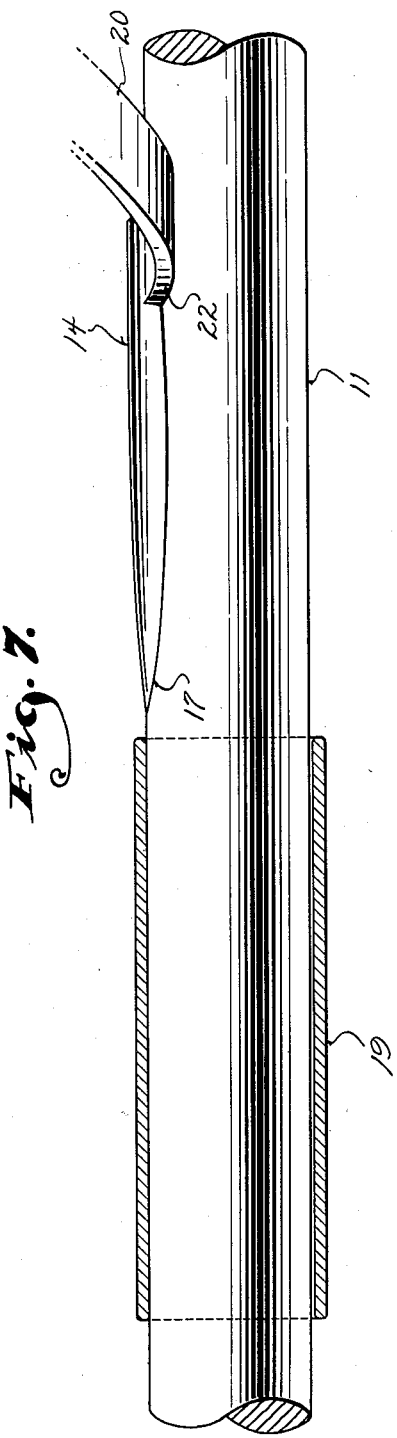
Figure 7 is a greatly enlarged view of a portion of a fishing rod showing the relationship between one of the attaching tangs of a line guide on the rod and one of the sleeves by which the guide is anchored to the rod but before application of the sleeve over the tang.

Referring now more particularly to the accompanying drawings, in which like numerals indicate like parts throughout the several views, the numeral 10 generally designates a fishing rod, in this instance a bait casting rod, having a tapering blade 11 which for illustration has been shown round in cross section. The blade is provided with a handle 12 at the butt end thereof having means (not shown) thereon for mounting a reel upon which a fishing line trained through a series of line guides 13 along the length of the blade may be wound. A tip guide 13' of conventional construction is fixed on the small end of the rod remote from the handle.

While the rod described is commonly referred to as a bait casting rod, the invention is equally as well suited for use on fly rods, and the application of the line guides to the bait casting rod shown is merely illustrative.

As will appear hereinafter, the line guides 13 may be of any standard construction. In the preferred embodiment of the invention, however, the opposite attaching tanks 14 which project from opposite sides of the guides to lie longitudinally along the exterior of the blade 11 are "coined" or formed to have the undersides 15 of the tangs which lay against the exterior of the blade correspond to the cross sectional shape of the blade. In the present instance, the blade is shown round in cross section, although triangular, square, and other multisided cross sectional shapes for the rod may be employed without departing from the spirit of the invention.

The undersides 15 of the tangs thus are shaped or "coined" with a radius corresponding to the radius of the rod at the desired line guide location so that the entire undersurface of the tangs may intimately contact and hug the exterior of the blade.

The tangs 14 are also given feathered side edges 16 and extremities 17 by the "coining" operation thereon so as to result in tangs having a more or less crescent shaped cross section with the ends of the crescent constituting the opposite side edges of the tangs. Attention is directed to the fact that these side edges 16, though quite sharp, lie directly against the exterior of the rod blade as shown in Figure 3, and that the top surface of the tangs is formed by a curved surface having a radius, viewing the tangs in cross section, which is only slightly less than the radius of the blade at the desired line guide location.

The attaching means for the line guides comprise pairs of sleeves 19 each greater in length than the attaching tangs 14 and of a material having a degree of elasticity. Referring to Figure 7, it will be seen that the sleeves for any one line guide on the rod are each of uniform diameter throughout their length and have an internal dimension only slightly greater than the cross sectional dimension of the blade at the desired location of the line guide.

While these sleeves are preferably made of aluminum or some other lightweight metal capable of withstanding the corrosive action of the elements, it is desired to point out that other materials, and particularly plastic sleeves, may be employed for the same purpose.

In either event, however, it will be noted from a consideration of Figure 7 that the corners of the sleeve at its opposite ends, and particularly the innermost corners, are slightly broken or chamfered so as to insure against any burr that might be present as a result of the cutting of a more or less lengthy tube into sleeves of the proper length.

Figure 8:
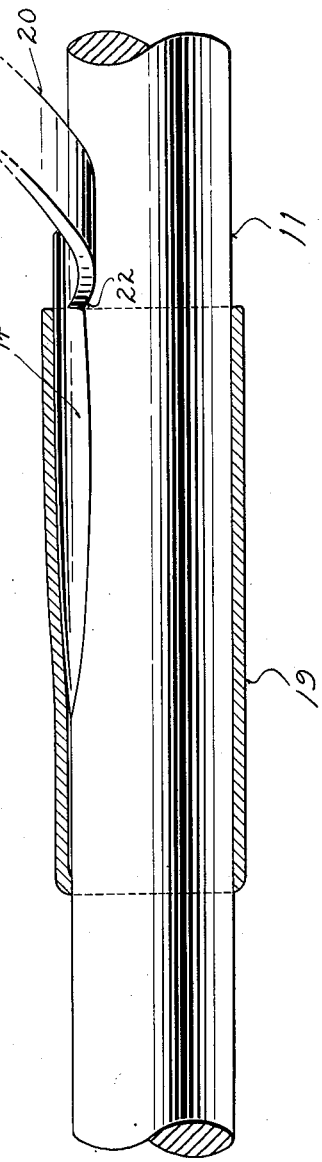
Figure 8 is a view similar to Figure 7 but showing the sleeve in its operative condition with its inner portion stretched over the tang on the line guide and its outer portion clinched or contracted into gripping engagement with the blade of the rod.

Figure 7 shows that the diameter of the sleeve interior is slightly greater than the diameter of the blade at the location at which the line guide is to be attached to the blade, but less than the diameter of the blade plus the maximum thickness of the crescent-shaped tang 14 on the line guide. From this it will be seen that the application of the sleeves over the line guide tangs to anchor the same in place entails a stretching of the inner extremities of the sleeves over the tangs, as seen in Figures 6 and 8, so that the resiliency of the metal or other material from which the sleeve is made acts to tightly squeeze the tangs against the exterior of the rod blade.

Referring to Figures 4 and 5, it will be seen that the tangs on the line guides are joined to the eyelets 21 of the guides by laterally extending arms 20 cradling the eyelet between them and converging on opposite sides of the eyelet to a junction with each other and with the tangs at the inner extremities of the tangs. These arms define shoulders 22 at their junctions with the opposite side edges of the tangs adjacent to the inner extremities thereof, and the inner extremities of the sleeves are passed over the ends of the attaching tangs on the guides into abutting relationship with these shoulders 22 so that the same define the positions of the sleeves on the tangs.

Attention is directed to the fact that in their lateral as well as their longitudinal dimension, the attaching tangs 14 of the line guides have maximum thickness along those portions of the tangs remote from the extremities and their side edges, with the result that the sleeves are caused to be stretched or expanded gradually and uniformly during longitudinal motion of the sleeves along the rod blade to pass over the extremities of the attaching tangs.

The broken or chamfered corners at the ends of the sleeves assure that the sleeves will ride over the feathered extremities of the attaching tangs during application of the sleeves to the tangs without becoming caught thereon in an objectionable manner. In this respect it is also desired to point out that the tangs for each of the line guides may converge slightly toward the eyelet of the guide so as to assure intimate contact between the extremities of the tangs and the exterior of the rod blade and thus preclude the possibility of the tang extremities offering any obstruction to passage of the sleeves thereover.

In applying the sleeves to the line guides, the blade of the rod with line guide in place thereon is preferably rigidly held between the jaws 25 of a suitable clamp or vice. It will be noted that the upper jaw 25 is bifurcated to receive the eyelet 21 of the line guide and prevent shifting of the guide lengthwise along the rod.

A pair of sleeves of the length and diameter proper for anyone guide location and of the proper size for the cross sectional dimension of the rod blade at the location of the guide having previously been slipped over the rod blade and disposed at opposite sides of the guide in the clamp are then simultaneously engaged by die elements 27. These die elements fit over the rod blade and have counterbores 28 in their opposing faces to receive the outer extremities of the sleeves. The dies are forcefully brought toward on another and the guide to simultaneously force the sleeves over the attaching tangs on the guide.

The dies 27, of course, are moved together an extent such as to bring the inner extremities of the sleeves into engagement with the shoulders 22 on the attaching tangs to thereby effect the desired stretching of the inner extremities of the sleeves over the tangs.

Attention is directed to the fact that the counterbores 28 in the dies have rounded bottoms 30 which act on the outer portions of the sleeves disposed in the counterbores to contract or shrink these portions of the sleeves tightly onto the rod blade during the final closing motion of the dies. The gripping engagement between the outer ends of the sleeves and the blade exterior is best illustrated in Figure 8, and assures maximum rigidity of the guide mounting as well as precluding any tendency of the guides to shift longitudinally of the rod.

Inasmuch as the diameter of the rod blade varies slightly at the opposite tang locations for any one guide due to the taper of the rod blades, it is preferable that the sleeves which are to be located at the butt sides of the guides have a slightly grater diameter than their cooperating sleeves at the tip sides of the guides to compensate for the taper of the blade. This permits the various pairs of sleeves to be stretched uniformly and progressively at their inner end portions during passage thereof over the attaching tangs 14 and avoids excessive shrinking or contracting of the outer end portions of the sleeves at the tip sides of the guides.

Due to the slight nature of the taper of the rod blade in the vicinity of the tip however, it is possible to employ a pair of sleeves of the same diameter for the securement of the guide nearest the tip (inwardly of the extreme tip) in place upon the blade.

The result of pressing the sleeves into position as described is an extremely rigid anchoring of the line guide to the rod blade and one wherein there is absolutely no tendency for the guide to rock laterally upon the blade or to shift longitudinally therealong. As stated, longitudinal shifting of the guide is prevented by the shrinking of the outer ends of the sleeves onto the exterior of the blade to form a lock which prevents the sleeves backing off of the tangs on the guide. Lateral shifting of the guide upon the blade is precluded by reason of the absence of any void space inside the sleeve and under the attaching tangs.

The same method is followed to secure the remaining line guides in place upon the rod blade, but as the taper of the blade results in the rod having a decreasing diameter toward its tip end, matched pairs of sleeves of correspondingly smaller diameter are used at the desired line guide locations.

The line guides described may be formed with the particular type of attaching tangs hereinbefore described either at the time of their manufacture or the guides may be of a conventional type 34 such as illustrated in Figure 5. This conventional guide is characterized by flat attaching tangs 14' and such guides may be rendered suitable for use with the method of this invention merely by subjecting the opposite tangs thereof to a coining operation to give the same the desired crescent-like cross sectional shape.

If desired, the conventional guide 34 may be employed without shaping or coining of its tangs to the configuration of the rod blade, and such a use of the guide is illustrated in Figure 9. As herein shown, the flat tangs 14' are applied to the exterior of the rod and a filler 35 which may be a suitable plastic or a cement applied to the spaces where the side edges of the tangs overlie and are spaced from the exterior of the rod blade so as to approach the condition shown in Figure 3.

A sleeve 36 may then be applied in the manner previously described and the resulting construction is one wherein lateral rocking of the guide is precluded by the absence of any void spaces beneath the attaching tangs of the guide and inside the sleeve adjacent to the tangs. In the Figure 9 embodiment it is contemplated that plastic sleeves be employed to anchor the line guide in place.

From the foregoing description taken together with the accompanying drawings, it will be readily apparent that this invention provides a neat appearing rigid and permanent joint for attaching line guides to the blades of fishing rods, and that the method of applying the attaching means assures against accidental displacement of the same from the tangs of the guide.

I claim:

The hereindescribed method of rigidly attaching a line guide to the blade of a fishing rod, which involves coining the oppositely projecting attaching tangs on the guide to the shape of the exterior of that portion of the blade at which the guide is to be attached; holding the guide in place with its tangs hugging the exterior of the blade; forcing sleeves substantially closely encircling the blade lengthwise along the blade toward one another and over the attaching tangs so as to stretch the inner end portions of the sleeves tightly over said tangs; and contracting the outer end portions of the sleeves firmly into engagement with the exterior of the blade.

REINERT F. DORNAUS.

REFERENCES CITED

The following references are of record in the file of this patent:

UNITED STATES PATENTS

| Number | Name | Date |
| --- | --- | --- |
| 670,961 | Lenarth | Apr. 12, 1901 |
| 842,761 | Buckwalter | Jan. 29, 1907 |
| 1,350,637 | Beaty | Aug. 24, 1920 |
| 1,413,998 | Templeton | Apr. 25, 1922 |
| 1,444,063 | Davis | Feb. 6, 1923 |
| 2,146,964 | Legat | Feb. 14, 1939 |
| 2,360,802 | Stenz | Oct. 17, 1944 |
| 2,370,603 | Zimmerman | Feb. 27, 1945 |